US010860427B1

(12) United States Patent
Chakraborty et al.

(10) Patent No.: US 10,860,427 B1
(45) Date of Patent: Dec. 8, 2020

(54) DATA PROTECTION IN A LARGE-SCALE CLUSTER ENVIRONMENT

(71) Applicant: EMC IP Holding Company LLC, Hopkinton, MA (US)

(72) Inventors: Anupam Chakraborty, Bangalore (IN); Sunil Yadav, Bangalore (IN); Satyendra Nath Sharma, Bangalore (IN); Soumen Acharya, Bangalore (IN); Tushar Dethe, Bangalore (IN); Upanshu Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 317 days.

(21) Appl. No.: 15/390,392

(22) Filed: Dec. 23, 2016

(51) Int. Cl.
*G06F 11/14* (2006.01)
(52) U.S. Cl.
CPC ...... *G06F 11/1451* (2013.01); *G06F 11/1464* (2013.01); *G06F 2201/80* (2013.01); *G06F 2201/84* (2013.01)
(58) Field of Classification Search
None
See application file for complete search history.

(56) References Cited

U.S. PATENT DOCUMENTS

| | | | | | |
|---|---|---|---|---|---|
| 8,326,803 | B1* | 12/2012 | Stringham | ............ | G06F 3/0619 707/652 |
| 8,473,463 | B1* | 6/2013 | Wilk | .................. | G06F 11/1453 707/647 |
| 9,201,887 | B1* | 12/2015 | Earl | ...................... | G06F 16/128 |
| 9,383,924 | B1* | 7/2016 | Fullbright | ............. | G06F 3/0608 |
| 9,417,815 | B1* | 8/2016 | Elisha | ................... | G06F 3/0655 |
| 9,535,907 | B1* | 1/2017 | Stringham | .......... | G06F 11/1435 |
| 2004/0103254 | A1* | 5/2004 | Satoyama | ............ | G06F 3/0613 711/150 |
| 2012/0136834 | A1* | 5/2012 | Zhao | ................... | G06F 11/1453 707/649 |
| 2012/0158662 | A1* | 6/2012 | Buragohain | ........ | G06F 11/1461 707/649 |
| 2013/0166863 | A1* | 6/2013 | Buragohain | ........ | G06F 11/1446 711/162 |
| 2015/0052528 | A1* | 2/2015 | French | .................. | G06F 9/4856 718/1 |
| 2017/0235505 | A1* | 8/2017 | Reddy CH | ............ | G06F 3/0607 711/162 |

* cited by examiner

*Primary Examiner* — Mark D Featherstone
*Assistant Examiner* — Tony Wu
(74) *Attorney, Agent, or Firm* — Staniford Tomita LLP

(57) ABSTRACT

A cluster includes cluster shared volumes and nodes. A subset of the nodes are designated as being backup proxy nodes responsible for backing up the cluster shared volumes. The cluster shared volumes are divided into groups, each group having a number of cluster shared volumes that is less than a total number of cluster shared volumes in the cluster. Generation is initiated for a particular snapshot for a number of cluster shared volumes belonging to a particular group. The backup proxy nodes backup data from the particular cluster shared volumes belong to the particular group using the particular snapshot. After the backup, the steps initiating snapshot generation and backing up are repeated until each group of cluster shared volumes has been backed up.

20 Claims, 9 Drawing Sheets

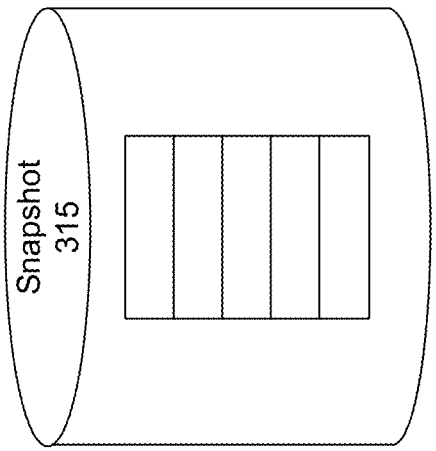
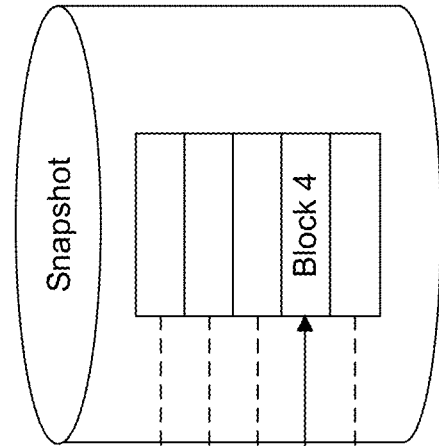
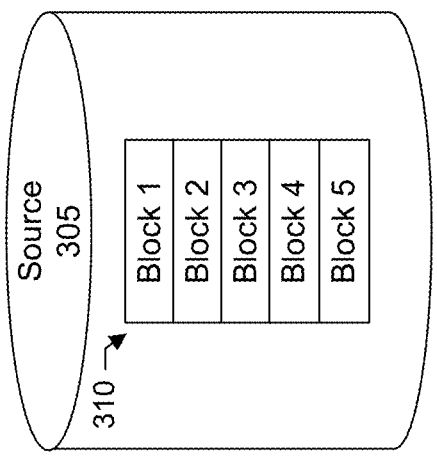
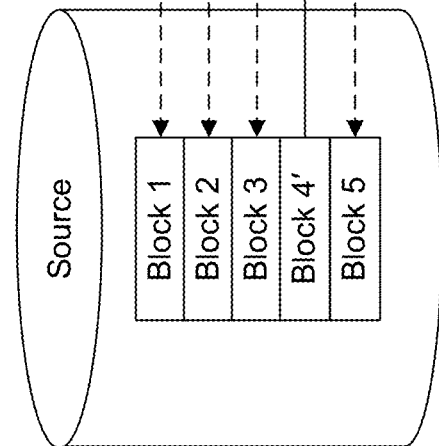
FIG. 3
FIG. 4

DATA PROTECTION IN A LARGE-SCALE CLUSTER ENVIRONMENT

TECHNICAL FIELD

Embodiments are generally directed to networked-based data backup methods, and more specifically to performing backups in a large-scale cluster environment.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

Clustering refers to a technique in which loads are spread over a collection of several connected nodes or servers. Clusters can be deployed to improve performance and availability over that of a single computer. Big data applications such as email applications, database applications, virtualization applications (e.g., virtual machines) may be supported by clustering techniques. For example, virtual machines can often be found running across nodes in a cluster. Virtual machines have emerged as one of the fundamental technologies that companies use in their data centers and elsewhere to manage data and provide services. A host node uses virtualization software to create and host any number of virtual machines. A virtual machine is a software abstraction of a real computer system.

As an organization, such as an enterprise, grows it may wish to increase the size of a particular cluster in order to handle increased processing workloads, service requests, and so forth. For example, the enterprise may wish to add nodes to the cluster, virtual machines, volumes, and so forth. In many cases, stopping the operations of a cluster so that a backup may be made is not acceptable because the cluster may be handling mission-critical production tasks. Nonetheless, it is important that the data in a cluster be backed up so that the data can be recovered in cases such as accidental deletion, data corruption, disasters and catastrophes, media failures, and so forth. Backing up data—especially large amounts of data—is not trivial and can involve large amounts of computing resources.

To avoid downtime, high-availability systems may instead turn to a snapshot as a way to perform a backup. A snapshot can provide a read-only copy of the data set frozen at a point in time—and allow applications to continue writing to their data. Using a snapshot to perform a backup can be an effective technique to perform a backup, with little or no interruption, in relatively small clusters.

Current snapshot techniques, however, are unable to accommodate the scaling of a cluster as, for example, the number of nodes, virtual machines, volumes, and so forth increase. Therefore, there is a need for improved backup systems and techniques for large-scale cluster deployments.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 3 shows a source volume and a snapshot of the source.

FIG. 4 shows the source and the snapshot after a change to the source.

DETAILED DESCRIPTION

Figure 1:
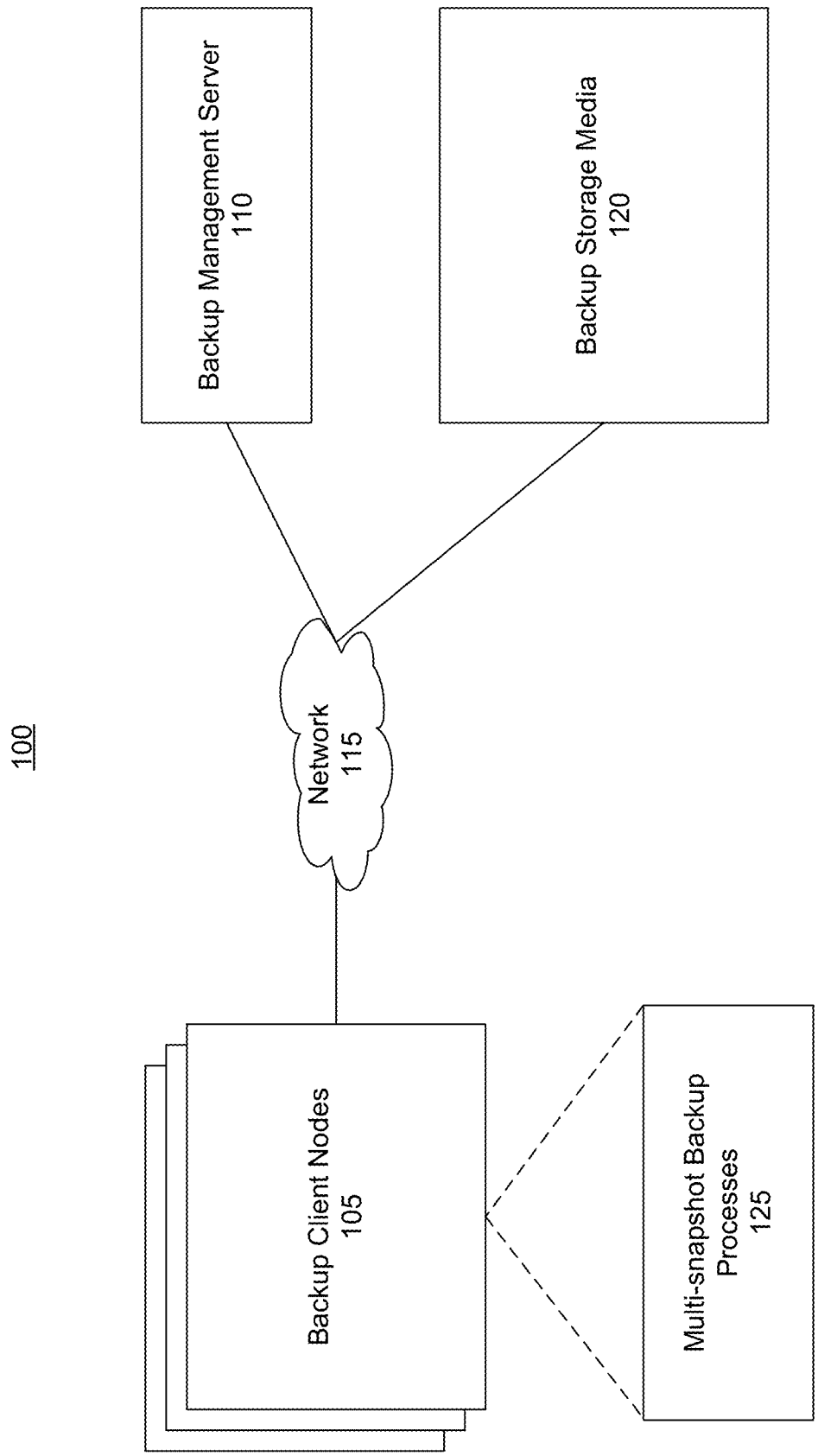
FIG. 1 shows a block diagram of a large-scale network implementing a data backup process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a non-transitory computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems for protecting data in a large-scale clustered server environment. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for data protection in a large-scale cluster environment. This environment may host any type of large or distributed application such as Microsoft Exchange, SQL Server, IBM Notes, and so forth. In a specific embodiment, the environment may include a large number of virtual machines (VMs) to be backed up such as hundreds or even many thousands of virtual machines. For example, there may be 500 VMs, 1,000 VMs, 5,000 VMs, 10,000 VMs, or more than 10,000 VMs. It should be appreciated that while some embodiments are shown and described in conjunction with backing up virtual machines, such as Hyper-V virtual machines, the systems and techniques can be applied to backing up any type of big data clustered application running on cluster shared volumes such as Exchange, SQL, and others.

In system 100, a number of clients 105 are provided to serve as backup clients or nodes. A network or backup server computer or management console 110 is coupled directly or indirectly to these clients through a network 115, which may be a cloud network, LAN, WAN or other appropriate network. Network 115 provides connectivity to the various systems, components, and resources of system 100, and may be implemented using protocols such as Transmission Control Protocol (TCP) and/or Internet Protocol (IP), well-known in the relevant arts. In a distributed network environment, network 115 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 120. The backup media may be located at any number of persistent storage locations and devices, such as local client storage, server storage, or network storage, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OST (OpenStorage) devices. In a specific embodiment, however, the target storage devices represent disk-based targets implemented through virtual machine technology.

For the embodiment of FIG. 1, network system 100 includes backup server 110, one or more nodes to be backed up 105, and backup media 120. In an embodiment, a backup client node executes processes 125 for backups of a large cluster of virtual machines using multiple snapshots. The backup server can provide a management console through which a user, such as a backup administrator, may configure the backup system, schedule backups, and so forth. For example, the management console may present the user with a graphical user interface (GUI) that is displayed on an electronic screen. Instead or additionally, there can be a programmatic interface such as an application programming interface (API).

In an embodiment, system 100 may represent a Data Domain Restorer (DDR)-based deduplication storage system, and a storage server having backup media 120 may be implemented as a DDR Deduplication Storage server provided by Dell EMC. However, other similar backup and storage systems are also possible. System 100 may utilize certain protocol-specific namespaces that are the external interface to applications and include NFS (network file system) and CIFS (common internet file system) namespaces, as well as a virtual tape library (VTL) or DD Boost provided by Dell EMC. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files.

Figure 2:
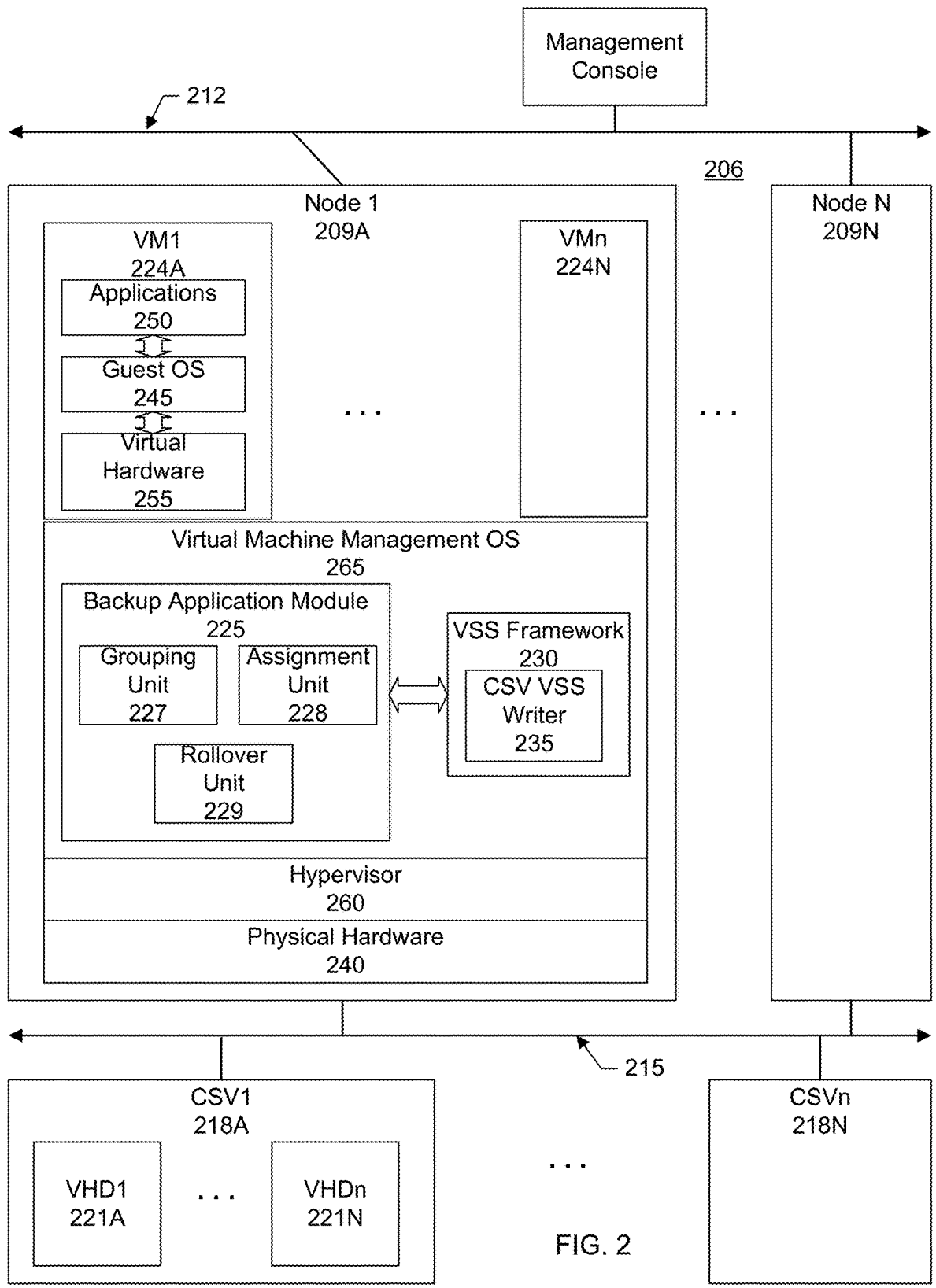
FIG. 2 shows a block diagram of a system capable of performing backups within a distributed large-scale cluster computing environment, according to a specific embodiment.

FIG. 2 shows a block diagram of a system capable of backing up a large-scale cluster in a distributed environment 206. This environment includes any number of nodes 209A-N. For example, there can be 10, 20, 30, 40, 50, 60, 100, 500, or more than 500 nodes. The nodes may be interconnected with each other through a network such as a local area network (LAN) 212. The nodes are further connected via a storage area network (SAN) 215 to any number of cluster shared volumes (CSVs) 218A-N. Examples of SAN protocols that may be used by the nodes to access the cluster shared volumes include iSCSI, Fiber Channel Protocol (FCP), Fiber Channel over IP (FCIP), Fibre Channel over Ethernet (FCoE), and others.

A cluster shared volume can include a set of hard disk drives logically grouped to expose a volume to which read operations, write operations, or both may be issued by one or more nodes of the cluster environment. The cluster shared volume may include a file system for organizing the data. Examples of file system formats include NTFS (New Technology File System), Resilient File System (ReFS), and others.

Any number of virtual hard disk drives 221A-N may be allocated to a cluster shared volume. In an embodiment, a virtual hard disk drive is formatted in the VHD or VHDX (Virtual Hard Disk) file format as provided by Microsoft. The VHD/VHDx format is a container format, which can contain disk related information (e.g., files and folders). VHD/VHDx files can be mounted and used as a regular disk. Volumes such as NTFS/ReFS/FAT32 or any file system which the OS supports on the mounted disk can also be created. In an embodiment, the virtual hard disk is used as the hard disk of a virtual machine.

In a specific embodiment, a cluster shared volume (CSV) is as provided by Windows Server from Microsoft. In this specific embodiment, a cluster shared volume is a shared disk having, for example, an NTFS or ReFS volume, that is made accessible for read and write operations by all nodes within the cluster. The cluster may be referred to as a Windows Server Failover Cluster.

A cluster shared volume enables a virtual machine (VM) mobility throughout the cluster as any node can access the VHD files on the shared volume. Cluster shared volumes can simplify storage management by allowing large numbers of VMs to be accessed off a common shared disk. CSV also increases the resiliency of the cluster by having I/O fault detection and recovery over alternate communication paths between the nodes in the cluster. In other words, the cluster of nodes can include failover clustering services provided by an operating system for the cluster to achieve high availability.

In this specific embodiment, a virtual machine may include a Hyper-V virtual machine. A Hyper-V virtual machine is a type of virtual machine provided by Microsoft. The Hyper-V VM is configured and the associated virtual hard disk(s) are created on or copied to a CSV disk. Multiple VHDs can be placed on a CSV that in turn are associated with multiple VMs which can be running on different nodes in the cluster. In other words, multiple (e.g., two or more) nodes can access the same disk simultaneously, concurrently, or in parallel.

A node in the cluster, such as node 209A, may host or run any number of virtual machines (e.g., VM1 224A . . . N). A node may host multiple virtual machines (e.g., two or more virtual machines). For example, a node may host 10, 20, 30, 40, 50, 100, 150, 200, 250, 500, or more than 500 VMs. A virtual machine can read data on a cluster shared volume, write data to a cluster shared volume, or both.

It is desirable that the clustered environment shown in FIG. 2 is backed up. Backups are critical to ensuring business continuity when a disaster or other disruptive event occurs. Backups, however, can be very disruptive to an organization as there is an expectation that services be available "24/7," i.e., available any time and every day. Throughout the day, an organization may generate a vast amount of data that may require large amounts of computing resources and time to properly backup. In a complex environment that includes many different users, there may be writes to the data while it is being backed up. This can result in data corruption or backups in which data is missing. But, for many organizations, pausing operations so that a backup can be performed is not operationally acceptable.

To facilitate backups, a backup application may use a snapshot to backup a clustered environment such as that shown in FIG. 2. A snapshot includes a set of reference markers or pointers to data stored on a storage device (e.g., disk drive, disk array, storage array, or storage area network (SAN)). A snapshot can provide a state of the system or a virtual copy of data at a particular point-in-time, e.g., time the snapshot was taken.

For example, FIGS. 3 and 4 show an example of a snapshot operation. FIG. 3 shows a data source 305 (e.g., source volume) which includes a set of blocks 310 in which data may be stored. In a snapshot backup, a region on storage may be set aside for a snapshot 315. Referring now to FIG. 4, when a block on the source is changed, the original data in the block may be copied to the snapshot. For example, in FIG. 4, a fourth block in the source has been changed as indicated by "block 4'" and the original data in the block has been written 420 to the snapshot as indicated by "block 4." The snapshot can be accessed to provide a view of the system at the time the snapshot was taken. More particularly, in this example, the snapshot may store the original data from the fourth block and include pointers 425 to the unchanged blocks (e.g., first, second, third, and fifth data blocks) on the source. There are many different types of snapshot copying such as copy-on-write (COW), redirect-on-write, clone or split mirror, and others.

Referring back now to FIG. 2, in a specific embodiment, each node in the cluster includes a backup application module or agent 225. In an embodiment, the backup application module includes a cluster shared volume grouping unit 227, volume assignment unit 228, and a rollover unit 229. It should be appreciated that the components shown in FIG. 2 can be functional entities and there can be many different configurations. For example, the grouping unit and assignment unit functionalities may be combined into a single code module. In other embodiments, the grouping and assignment units may reside in separate code modules. Various modules of the system may be implemented at any level such as at the application level, operating system level, and so forth.

In a specific embodiment, the backup application module leverages a framework or service 230 referred to as volume shadow copy service (VSS) as provided by Microsoft. VSS is an operating system (e.g., Microsoft Windows) resident service that allows for generating a snapshot of computer files or volumes even when they are in use. A snapshot may be referred to as a shadow copy. VSS can be used in conjunction with a file system (e.g., NTFS) that is able to create and store shadow copies of files or volumes. As discussed, a snapshot backup is a read-only copy of a volume at a particular point in time. A snapshot allows for the creation of consistent backups of a volume and helps to ensure that contents do not change and are not locked while the backup is in progress. Snapshots can be the first step in an incremental or full backup session.

The components involved in VSS snapshot backups include providers, requesters, and writers. Providers manage running volumes and create the shadow copies of them on demand. A provider is responsible for intercepting I/O requests between the file system and the underlying mass storage system; capturing and retrieving the status of a volume at the time of shadow copy; maintaining a "point in time" view of the files on the disk with no partial I/O operations reflected in its state; and using this "point in time" view to expose a virtual volume containing the shadow copied data.

A requester refers to an application (e.g., backup application) that uses the VSS application programming interface (API) to request the services of the volume shadow copy service to initiate generating a snapshot. The requester also communicates with writers to gather information on the system and to signal writers to prepare their data for backup.

Writers store persistent information in files on disk and provide the names and locations of these files to requesters by using the shadow copy interface. During backup operations, writers ensure that their data is quiescent and stable—suitable for shadow copy and backup. More particularly, VSS uses a collection of VSS writers, such as a CSV writer 235, to help bring the virtual machines (e.g., Hyper-V virtual machines) into a consistent state prior to the creation of a snapshot. The backup application module can read the snapshot to perform the backup of the virtual machines across the various cluster shared volumes.

A snapshot is attractive for backups because it is designed to be created very quickly while the application is still running (or with little disruption to the application) as a snapshot is a virtual copy of the data and not the actual copy. For example, it can be much faster to designate an area on disk for a snapshot and use pointers to data as compared to copying the entire actual source data.

Current snapshot backup systems and techniques, however, have not been able to accommodate large-scale distributed computing environments involving large amounts of data such as large numbers of virtual machines across many CSVs. Disclosed herein are systems and techniques of backing up a big data clustered application running on cluster shared volumes using multiple snapshots. These systems and techniques may be used with applications such as Exchange, SQL, and Hyper-V, among many others.

In an embodiment, systems and techniques are provided for generating multiple snapshots and backing up large distributed environments using the multiple snapshots. More particularly, in a specific embodiment, grouping unit 227 is responsible for grouping the volumes into various groups of cluster shared volumes. Assignment unit 228 is responsible for assigning backup ownership of the various volumes in a group to a subset of nodes in the cluster that have been designated as backup proxy nodes. A volume snapshot for a particular group is then created. Rollover unit 229 of a backup proxy node can then use the snapshot to rollover or backup the volume (or volumes) that they have been assigned.

Once a snapshot backup of the particular group has been completed, a next group of volumes in the cluster is snapshotted and the process repeats until all volumes in the cluster have been backed up. For a large cluster, the use of multiple snapshots to perform a particular backup of an entire cluster can be more effective than using a single snapshot to perform the particular backup.

A node in the distributed environment, such as node 209A, can be a general purpose computer with software and hardware. For example, physical hardware 240 may include a processor, storage, input/output (I/O) controller, network interface, and memory each of which may be interconnected by a bus architecture or any interconnection scheme. A node can use virtualization software to run the virtual machines (e.g., VMs 224A-N on node 209A).

Generally, virtualization is an abstraction layer that allows multiple virtual environments to run in isolation, side-by-side on the same physical machine. A virtual machine (VM) is a software implementation of a machine (e.g., a computer) that executes programs like a physical machine. In other words, the virtual machine is a software abstraction of a physical computer system that is installed as a "guest" on a "host" hardware platform. Thus, a virtual machine may include a guest operating system 245, guest applications 250 running on the guest operating system, and virtual hardware 255 which represents a hardware state of the virtual machine. Each virtual machine may be assigned an identifier such as an Internet Protocol (IP) address, globally unique identifier (GUID), or both.

In a specific embodiment, the virtualization software includes a hypervisor 260 and a virtual machine management operating system (OS) 265. In this specific embodiment, the virtualization software or platform includes Hyper-V from Microsoft Corporation of Redmond, Wash. It should be appreciated that while some embodiments are shown and described in conjunction with Hyper-V and VMMS, aspects and principles of the system can be applicable to other virtualization platforms and services and other large-scale applications.

In this specific embodiment, the hypervisor is a thin layer of software between the hardware and virtual machines. The hypervisor is responsible for ensuring partition isolation and managing memory. The virtual machine management OS may be located in a specialized partition referred to as the parent partition and may include the virtualization stack and hardware specific device drivers. Virtual machines VMs 224A . . . N are in guest partitions and go through the parent partition for their device access. In other words, a virtual machine environment may utilize a hypervisor (e.g., Hyper-V) to create and run the virtual machines. A computer running the hypervisor is a host machine and all virtual machines are guest machines running guest operating systems (OS). The hypervisor provides the guest operating systems with a virtual operating platform and manages the execution of the VMs.

As shown in the example of FIG. 2, each node includes backup application module 225. In a specific embodiment, the backup module is configured to operate with the Hyper-V hypervisor, which is a native hypervisor that creates VMs on Intel x86-64 based systems and is an integral part of the Microsoft Windows server products. In this specific embodiment, the backup module may be referred to the Networker Module for Microsoft (NMM) as provided by Dell EMC.

In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

Figure 5:
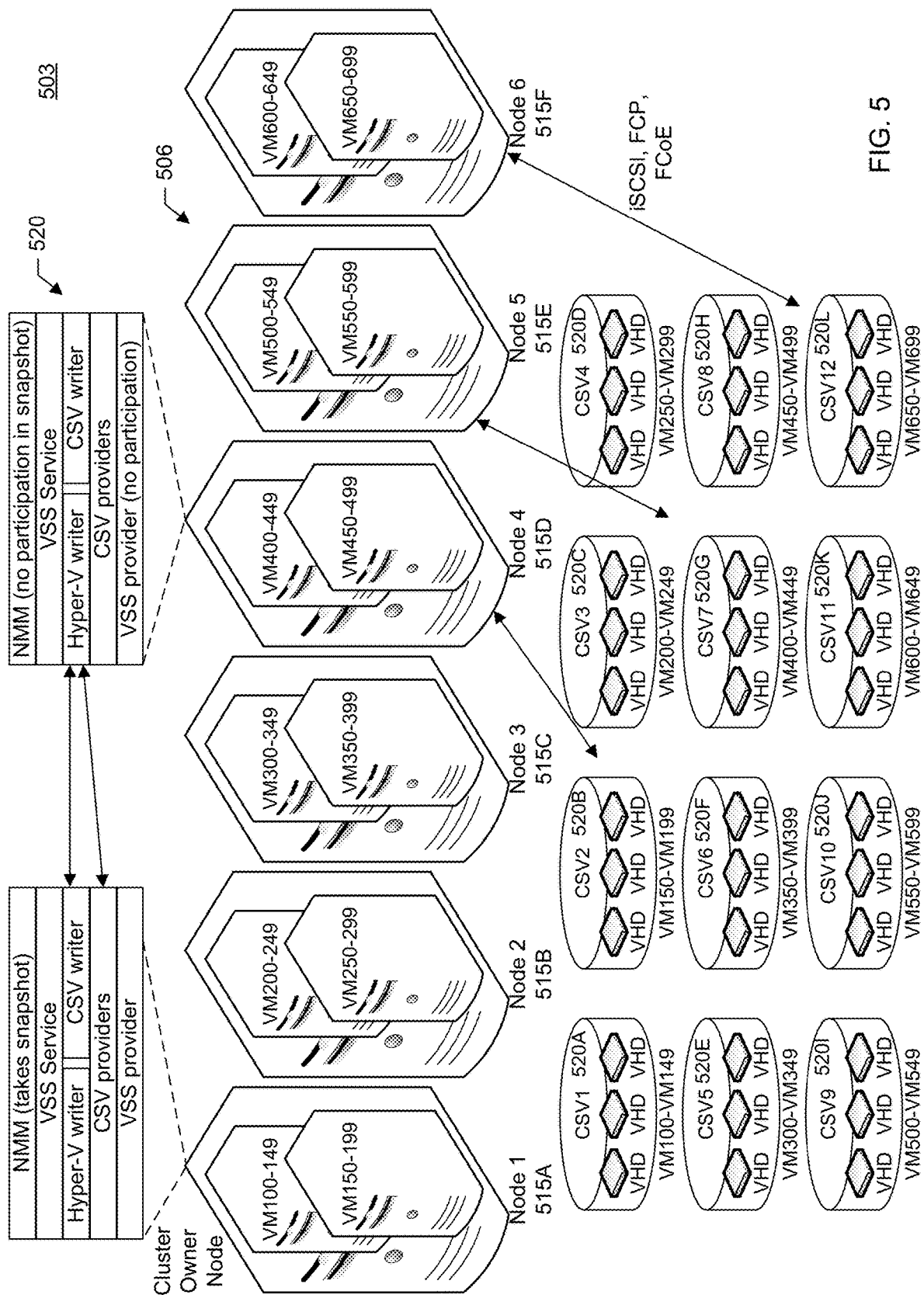
FIG. 5 shows a specific example of a large-scale distributed cluster computing environment.

FIG. 5 shows an example of a distributed environment 503 where, as an example, a cluster 506 includes six nodes 515A-F, twelve cluster shared volumes (CSVs) 520A-L, and 600 virtual machines on the cluster. In this example, first node 515A has been designated as the cluster owner node and fourth, fifth, and sixth nodes 515D-F have been designated as backup proxy nodes. There are 50 virtual machines per CSV and 100 virtual machines active on each node. A process 520 shows a flow and components involved in generating a snapshot. The figure shows the state of the VMs and CSV ownerships before a backup starts.

In particular, VM100-199 are active on first node 515A. VM100-149 are on CSV1 520A and VM150-199 are on CSV2 520B. VM200-299 are active on second node 515B. VM200-249 are on CSV3 520C and VM250-299 are on CSV4 520D. VM300-399 are active on third node 515C. VM300-349 are on CSV5 520E and VM350-399 are on CSV6 520F. VM400-499 are active on fourth node 515D. VM400-449 are on CSV7 520G and VM450-499 are on CSV8 520H. VM500-599 are active on fifth node 515E. VM500-549 are on CSV9 5201 and VM550-599 are on CSV10 520J. VM600-699 are active on sixth node 515F. VM600-649 are on CSV11 520K and VM650-699 are on CSV12 520L.

It should be appreciated that these specific numbers of nodes, virtual machines, CSVs, and backup proxy nodes in FIG. 5 are presented merely for example. The number of nodes, virtual machines, CSVs, and backup proxy nodes can vary greatly. For example, there can be 5000 virtual machines across 15 CSVs supported by five nodes in the cluster, two of which are backup proxy nodes. A number of VMs residing on a CSV may be the same as or different from a number of VMs residing on another CSV. A number of VMs active on a node may be the same as or different from a number of VMs active on another node.

In the example shown in FIG. 5, the nodes in the cluster are Microsoft Hyper-V servers, the virtual machines are Hyper-V virtual machines, and the volumes are Microsoft cluster shared volumes. Microsoft Hyper-V servers are being rapidly deployed in various customer environments. In order to achieve high availability, Hyper-V virtual machines can be configured in a clustered environment with the data stored on a "Cluster Shared Volume" (CSV). The size of these deployments is growing day-by-day and so is the need to protect these expanding deployments. As the environment scales, the number and size of CSV volumes increases.

In an embodiment, a backup application uses the "Cluster Shared Volume VSS Writer" (CSV Writer) to take a VSS snapshot of clustered virtual machines present on CSV volumes. CSV in Microsoft Windows Server 2012 and later supports a distributed application consistent backup of all VMs from a single node of the cluster, using new CSV writer and CSV provider components.

In an embodiment, a backup application leverages the new CSV writer functionality and takes a single VSS snapshot of all VMs running over multiple Hyper-V cluster nodes. This method may be referred to as "Single Snapshot" based Hyper-V CSV backup. The "Single Snapshot" feature of CSV writer reduces the complexity otherwise involved in backing up a distributed environment.

But, as the size of the environment grows, it has been discovered that the "Single Snapshot" functionality has scalability issues. The VSS framework is unable to take a snapshot of a scaled out environment with large number of VMs on CSV disks and reports snapshot failure with error code 0x80780021 [Windows Backup timed-out before the shared protection point was created]. In such a large environment, it is observed that the backup operation fails for snapshot creation with Microsoft VSS framework reporting a timeout error.

In a specific embodiment, an algorithm is provided to protect Hyper-V scaled-up environments. In this specific embodiment, to mitigate the VSS snapshot failure in Hyper-V scale out environments, a backup application module takes number of snapshots instead of a "Single Snapshot" of the entire CSV environment. In this specific embodiment, to achieve maximum or good throughput, VMs are grouped by the CSV volumes on which they are present. After that, the backup application module takes number of snapshots using the CSV writer serially for each group of VMs.

As discussed, FIG. 5 shows an example of a 6 node Hyper-V Cluster with 600 Virtual Machines. These 600 VMs are distributed on 12 CSV volumes. A backup application module, such as Networker Module for Microsoft (NMM) as provided by Dell EMC, is installed on all nodes. In this example, node4 515D, node5 515E, and node6 515F are designated as backup proxy by the backup administrator. NMM installed on "Cluster Owner Node" (node1 515A) takes part in snapshot creation. NMM installed on node4 515D, node5 515E, and node6 515F are responsible for rolling over or backing up that VM data from a VSS snapshot to the backup media.

Figure 6:
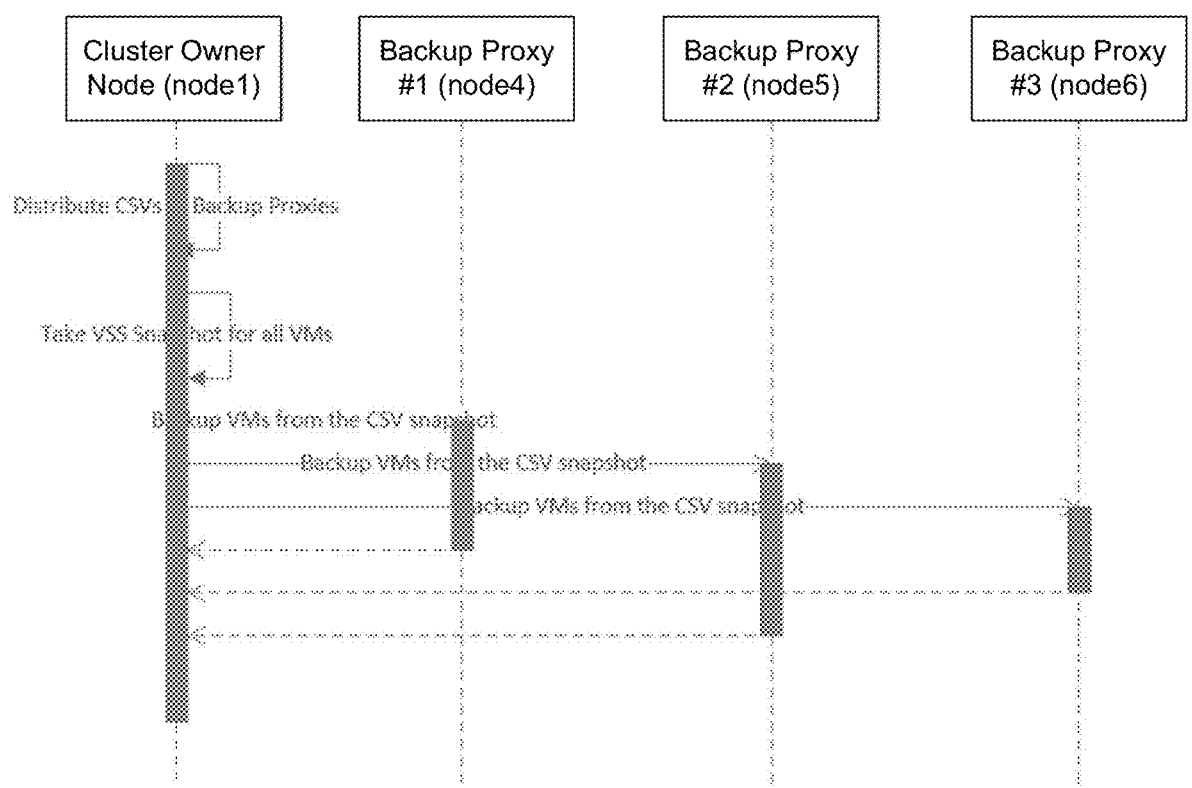
FIG. 6 shows a unified modeling language (UML) sequence diagram for a "single snapshot" backup, according to a specific embodiment.

Table A below shows a flow for a "single snapshot" backup using the example shown in FIG. 5. FIG. 6 shows a UML sequence diagram for a "single snapshot" backup using the example shown in FIG. 5.

TABLE A

| Step | Description |
|---|---|
| 1 | Networker backup job starts on the "Cluster Owner" node (node 1). This job is known as the "Primary Job." |
| 2 | The "Primary Job" distributes the CSV ownership as per the user specified virtual\physical proxies. In this example user has specified node4, node5, node6 as backup proxies.<br>After the assignment of proxy ownership node4 is the owner of {CSV1, CSV2, CSV3, CSV4}; node5 is the owner of {CSV5, CSV6, CSV7, CSV8}; and node 6 is the owner of {CSV9, CSV10, CSV11, CSV12}. |
| 3 | The "Primary job" spawns a child process on the "Cluster Owner" node called "Snapshot job" to take a VSS snapshot of all CSV volumes and all virtual machines. |

TABLE A-continued

| Step | Description |
|---|---|
| | Using the example of the distributed environment shown in FIG. 5, the snapshot includes all 12 CSV volumes and all 600 VMs. |
| 4 | After snapshot creation is successful, primary job creates "Rollover Jobs" on proxy nodes. These "Rollover Jobs" on proxy nodes can mount snapshot of CSV volumes (owned by the proxy) and rollover them in parallel to backup media. |
| 5 | After rollover is finished the "Snapshot Job" commits the backup status of each virtual machine. When a virtual machine is committed with "true" its older AVHDX (a differencing file that is created when a snapshot is made) is merged to the parent VHDX. There can be a new AVHDX to start tracking the incremental changes from the last backup. |

As discussed above, however, snapshot creation (step 3) fails in cases involving a scaled-up Hyper-V Cluster. The error code reported includes 0x80780021 [Windows Backup timed-out before the shared protection point was created].

In a specific embodiment, the system provides for multiple (e.g., two or more) snapshots of the cluster to be generated for a particular backup. In this specific embodiment, the system allows the backup administrator to specify whether to backup the cluster using a single snapshot or multiple snapshots. Some of the factors an administrator may consider when deciding between the two options includes the number of virtual machines on the cluster, available computing resources of the cluster (e.g., processor speed and capability, network bandwidth, storage device performance), sizes of the virtual machines, sizes of the CSVs, and the like. For example, if there is a large number of virtual machines in the cluster to backup, the backup administrator may specify the multiple snapshot backup option. Alternatively, if there is a relatively small number of virtual machines in the cluster to backup, the backup administrator may specify the single snapshot option.

In an embodiment, with the specification of the multiple snapshot backup option, the backup administrator can specify the number of snapshots or CSV groups to create for the backup of the virtual machines in the cluster. In a specific embodiment, the virtual machines are grouped based on the volume number (or other volume identifier) of the CSV in which the virtual machines reside. For example, a first snapshot may include a first subset of CSVs on which a first subset of VMs reside. A second snapshot may include a second subset of CSVs on which a second subset of VMs reside. A third snapshot may include a third subset of CSVs on which a third subset of VMs reside, and so forth.

Figure 7:
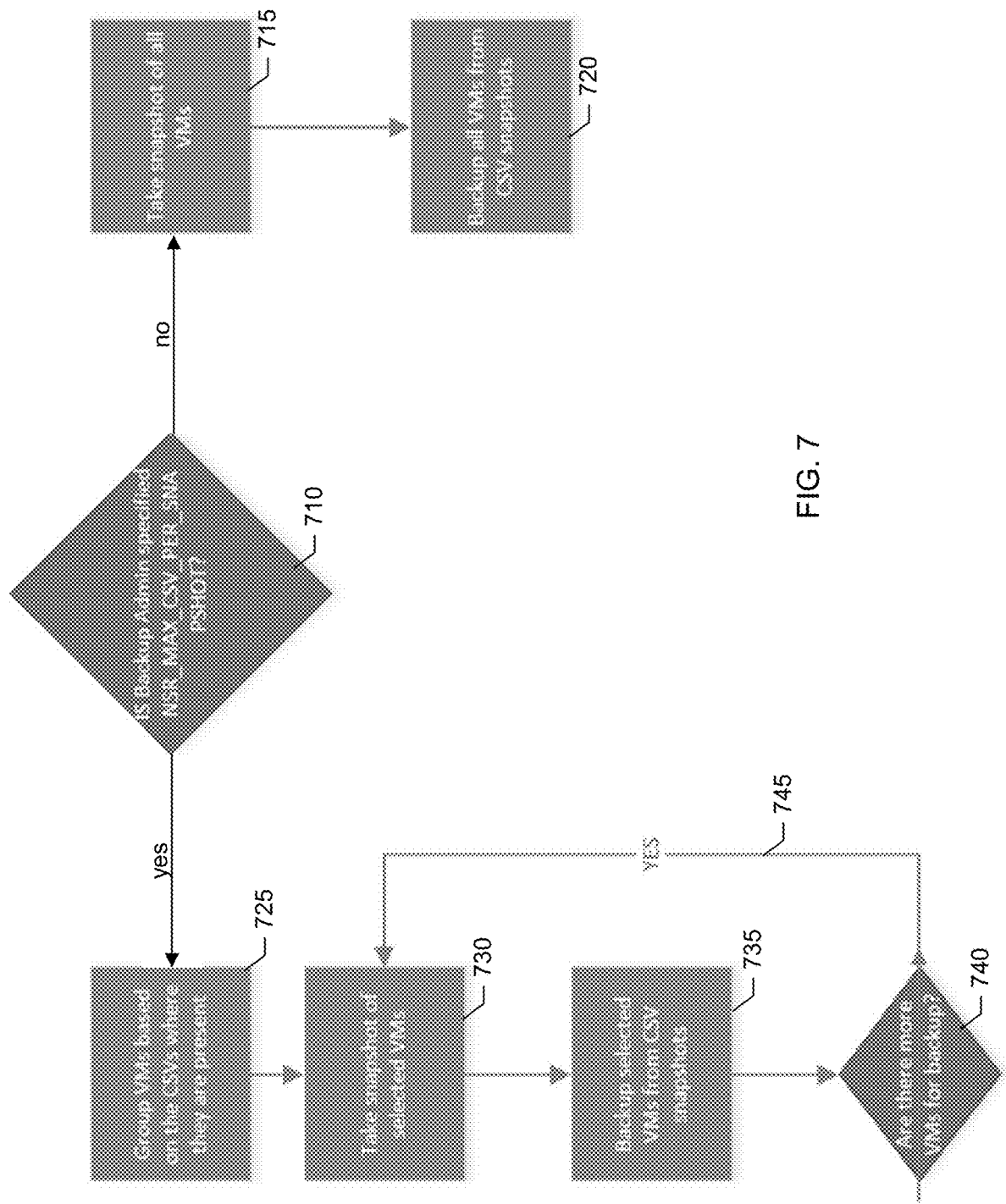
FIG. 7 shows an overall flow for backing up a cluster using multiple snapshots, according to a specific embodiment.

FIG. 7 shows an overall flow of a process for backing up a distributed environment having a cluster of nodes and virtual machines residing on various cluster shared volumes (CSVs) in the cluster. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 710, the system determines whether the backup administrator has specified single or multiple snapshots. In a specific embodiment, the parameter is identified as "NSR_CSV_PER_SNAPSHOT[1/2/3 . . . /# CSV]." It should be appreciated, however, that the parameter may be identified using any label or identifier. In this specific embodiment, since the virtual machines are grouped according to the volume of the CSV on which they reside, the maximum value of the parameter is equal to the number of CSVs. For example, the example of the scenario shown in FIG. 6 includes 12 cluster shared volumes (e.g., CSVs 520A-L). Thus, the backup administrator may specify any integer between 1 and 12.

If the backup administrator specifies the single snapshot option, in a step 715, a single snapshot of all VMs in the cluster is generated. And (assuming the snapshot generation was successful), the backup application module backups all VMs from the snapshot of the cluster shared volumes (step 720).

Alternatively, if the backup administrator selects the multiple snapshot option by specifying two or more groupings of virtual machines, in a step 725, the system groups the virtual machines based on the cluster shared volumes (CSVs) where they are present. In a step 730, a snapshot is take of the selected VMs. In a step 735, the backup application module backs up the selected VMs from the CSV snapshot. In a step 740, the system determines whether there are any more VMs for backups. If so, the system selects a next grouping of VMs and loops back 745 to repeat the snapshot generation and backup processes.

Figure 8:
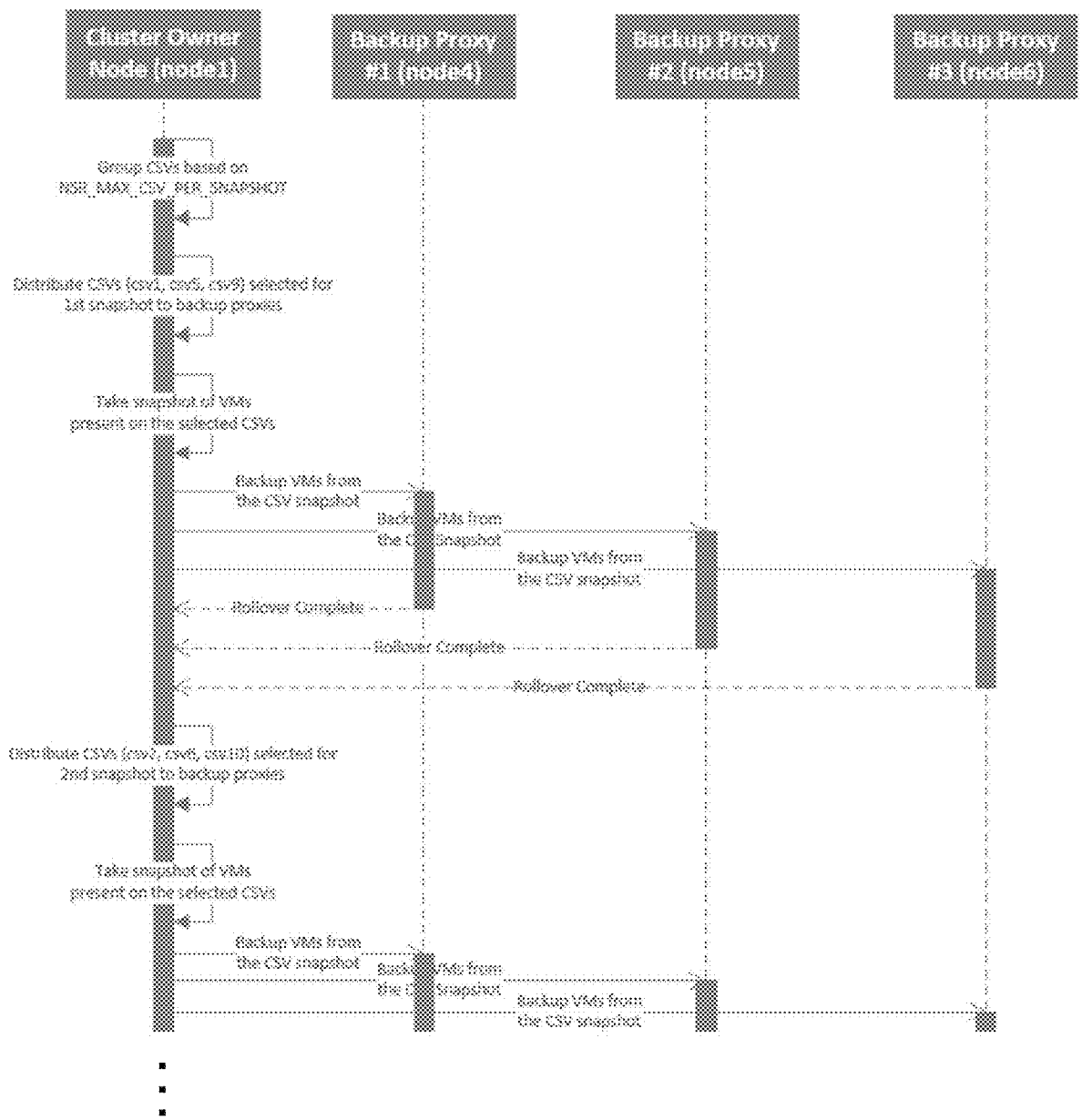
FIG. 8 shows a UML sequence diagram for a "multiple snapshot" backup, according to a specific embodiment.

Table B below shows a flow for a "multiple snapshot" backup using the example shown in FIG. 5. FIG. 8 shows a UML sequence diagram for a "single snapshot" backup using the example shown in FIG. 5. In this example, the backup administrator has specified 3 groups of CSVs (i.e., NSR_CSV_PER_SNAPSHOT=3)

TABLE B

| Step | Description |
|---|---|
| 1 | Backup application (e.g., Dell EMC Networker) backup job starts on the cluster owner node. This job may be referred to as the "Primary job." |
| 2 | The primary job groups total number of CSVs based on user specified parameter NSR_CSV_PER_SNAPSHOT. In this example, let the CSV grouping for multiple snapshots be as follows: A first snapshot includes{csv1, csv5, csv9}. A second snapshot includes{csv2, cvs6, csv10}. |

TABLE B-continued

| Step | Description |
|---|---|
| | A third snapshot includes {csv3, cvs7, csv11}. |
| | A fourth snapshot includes {csv4, cvs8, csv12}. |
| 3 | The primary job distributes the CSV ownership to user specified physical proxies. In this example, let the CSV Ownership of {csv1, csv5, csv9} be as follows: Fourth node4 owns csv1. Fifth node5 owns csv5. Sixth node6 owns csv9. |
| 4 | The primary backup job spawns a child process which may be referred to as "Snapshot job" to take a VSS snapshot of {csv1, csv5, csv9} csv volumes and all virtual machines on these CSV volumes. |
| 5 | After snapshot creation is successful, primary job creates "Rollover Jobs" in proxy nodes {node4, node5, node6}. These rollover jobs copies the data to backup media in parallel. It copies the VMs on csv1 from node4, csv5 from node5, and csv9 from node6. |
| 6 | After the rollover is complete for CSV volumes {csv1, csv5, csv9} the "Snapshot Job" commits the backup status of virtual machines present on these CSVs. |
| 7 | The "Primary Job" then spawns another "Snapshot Job" to take the snapshot of {csv2, csv6, csv10} and all virtual machines on these CSV volumes. |
| 8 | After snapshot creation is successful, primary job creates "Rollover Jobs" in proxy nodes {node4, node5, node6} parallel. |
| 9 | After the rollover is complete for CSV volumes {csv2, csv6, csv10} the "Snapshot Job" commits the backup status of virtual machines present on these CSVs. |
| 10 | The process (e.g., steps 7-9) are repeated until all the CSV volumes have been backed up. |

In the example of the workflow shown in Table B above, in each snapshot there are three CSV volumes participating because the user has specified three backup proxy nodes (fourth, fifth, and sixth nodes 515D-F) and the backup application module (e.g., NMM) can rollover in parallel from the three proxy nodes. The parameter NSR_CSV_PER_SNAPSHOT can control the maximum number of CSVs that can participate in a snapshot. The maximum value of NSR_CSV_PER_SNAPSHOT is the number of CSVs. In the above example if NSR_CSV_PER_SNSPSHOT=4 then only four CSVs will participate per snapshot though the number of backup proxies is three.

Figure 9:
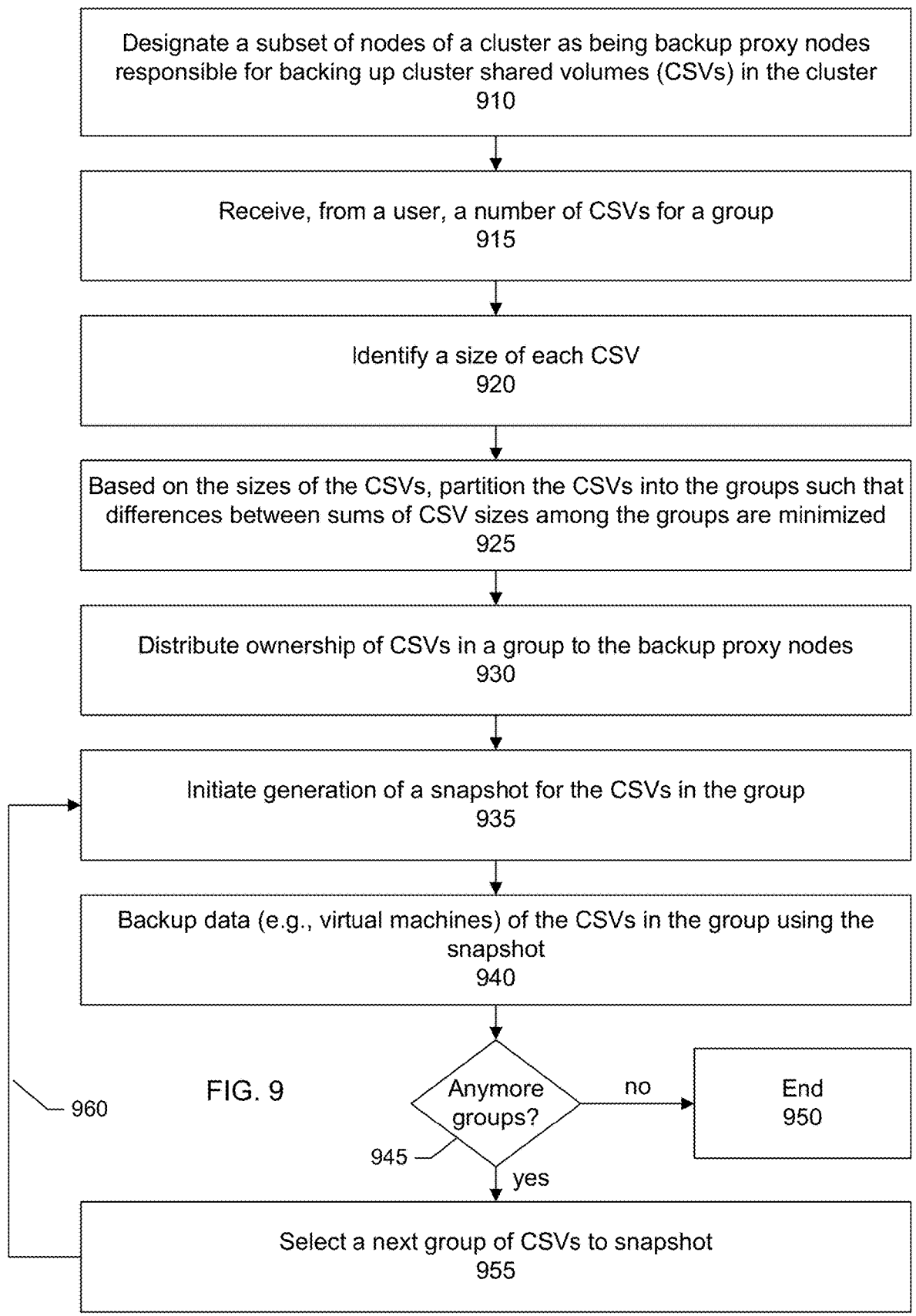
FIG. 9 shows another flow for backing up a cluster using multiple snapshots, according to a specific embodiment.

FIG. 9 shows another flow of a process for backing up a distributed environment having a cluster of nodes and virtual machines residing on various cluster shared volumes (CSVs) in the cluster. In a step 910, a subset of nodes in a cluster are designated as being backup proxy nodes responsible for backing up volumes (e.g., cluster shared volumes) in the cluster. In an embodiment, the number of nodes to be designated as backup proxy nodes is a user-configurable value. That is, the system can prompt and receive from the backup administrator the number of nodes in a cluster of nodes that should be the backup proxy nodes.

Factors that may be considered in determining which nodes of a cluster should be the backup proxy nodes include the overall number of nodes in a cluster, the processing and computing resources available to the nodes, the performance of the primary storage devices, the performance of the backup media storage devices (e.g., traditional hard disk drives versus solid state drives (SSD)), backup window, recovery time objective (RTO), recovery point objective (RPO), desired backup completion times, expected production load on the cluster during a backup, and the like.

For example, designating a large number of nodes in a cluster as being backup proxies can reduce the time required to complete a backup of the volumes. However, this leaves fewer nodes dedicated to servicing other requests. Conversely, designating a fewer number of nodes as being backup proxies can increase the overall time to complete the backup of the volumes, but provides more nodes dedicated to servicing other requests.

In a step 915, a number value indicating a number of cluster shared volumes for a group is received from the user (e.g., backup administrator). The number indicates the number of CSVs that should be participating or included in a snapshot. The system may receive from the user a number of CSVs in each group. Factors to consider in determining the number of groups that the system should create may include factors similar to those discussed above for determining which nodes of a cluster should be the backup proxy nodes. For example, a fewer number of groups and thus snapshots can reduce the complexity involved in backing up the cluster. However, the snapshot generation process may fail or timeout when there are a very large number volumes and virtual machines, and largely sized volumes and virtual machines, and so forth that are associated with a snapshot.

After the number of CSVs in a group to create or groups to create is received, a load balancing algorithm is used to assign the various CSVs to the various groups. The load balancing helps to efficiently distribute the backup work across the designated backup proxy nodes. Load balancing helps to ensure that no one backup proxy node is over-utilized while another backup proxy node is under-utilized, which could degrade backup performance.

Specifically, in a step 920, sizes of the CSVs are identified. In a step 925, based on the sizes of the CSVs, the system partitions, divides, groups, splits, or assigns the various CSVs into the various groups such that differences between sums of CSV sizes among the groups are minimized. Each group will include a number of volumes that is less than a total number of volumes in the cluster.

Consider, as an example, that a cluster includes six CSVs to be divided into two groups. A first volume (CSV1) has a size of 100 gigabytes (GB). A second volume (CSV2) has a size of 100 GB. A third volume (CSV3) has a size of 50 GB. A fourth volume (CSV4) has a size of 50 GB. A fifth volume (CSV5) has a size of 20 GB. A sixth volume (CSV6) has a size of 20 GB.

The system balances the dividing of the six volumes into the two groups such that a first group for a first snapshot includes the first, third, and fifth volumes, i.e., {CSV1, CSV3, CSV5}. In other words, volumes CSV1, CSV3, and CSV5 of the cluster belong to the first group.

A second group for a second snapshot includes the second, fourth, and sixth volumes, i.e., {CSV2, CSV4, CSV6}. In other words, volumes CSV2, CSV4, and CSV6 of the cluster belong to the second group.

This assignment of particular volumes to the groups minimizes the size differences between the two groups. For example, a total size of the first group is 170 GB (100 GB (size of CSV1)+50 GB (size of CSV3)+20 GB (size of CSV3)=170 GB). A total size of the second group is 170 GB (100 GB (size of CSV2)+50 GB (size of CSV4)+20 GB (size of CSV6)=170 GB). A difference between the two sizes is zero (170 GB−170 GB=0). The number of volumes in the first group is three which is less than the total number of volumes in the cluster (i.e., six). The number of volumes in the second group is three which is also less than the total number of volumes in the cluster.

In a specific embodiment, the subset sum algorithm is used to group the CSVs based on size. It should be appreciated, however, that any competent algorithm may be adapted to optimize or facilitate the partitioning of CSVs into various groups of balanced sizes.

In a step 930, ownership of volumes (CSVs) in a particular group is distributed to the backup proxy nodes. Depending on factors such as the number of backup proxy nodes available, number of groups created, number of volumes in a group, and so forth, a backup proxy node may be responsible for one or more than one volume. The number of volumes a backup proxy node is responsible for may be the same as or different from the number of volumes another backup proxy node is responsible for.

In a step 935, generation or creation of a snapshot of the CSVs in the group is initiated. In an embodiment, a particular snapshot includes the particular CSVs in the particular group (or, more specifically, the virtual machines residing on the CSVs in the group) and excludes or omits other CSVs of the cluster that are not in the particular group. Snapshot generation may be initiated for a particular snapshot for a number of cluster shared volumes or multiple (e.g., two or more) CSVs belonging to a particular group.

In a step 940, after the snapshot has been generated, data (e.g., virtual machines) of the volumes (CSVs) in the group is backed up using the snapshot. The backing up of a volume in a group can be performed in parallel, concurrently, or simultaneously with the backing up of another volume of the group.

For example, there can be a first group, a first backup proxy node, and a second backup proxy node, different from the first backup proxy node. The first group includes a first volume and a second volume, different from the first volume. The first backup proxy node is assigned ownership of the first volume. The second backup proxy node is assigned ownership of the second volume. A first snapshot is generated and includes both the first and second volumes. The first backup proxy node backs up the first volume from the first snapshot to a backup storage. During or while the first backup proxy node is backing up the first volume from the first snapshot, the second backup proxy node is backing up the second volume from the first snapshot to the backup storage.

After the backup from the snapshot has completed, in a step 945, a determination is made as to whether there are any remaining groups. If there are no remaining groups, the process ends (step 950).

Alternatively, if there are one or more remaining groups, a next group of CSVs is selected for snapshot (step 955) and the process loops back 960 to repeat the snapshot creation and backing up steps (steps 935 and 940) until snapshots have been made of all volumes in the cluster and backed up.

In a specific embodiment, (as shown in FIG. 9 and the UML sequence diagram in FIG. 8), the snapshotting and backing up from a snapshot is performed serially. In other words, to backup an entire cluster having four volumes, there can be a first group that includes first and second volumes of a cluster. There can be a second group that includes third and fourth volumes of the cluster. A first snapshot corresponding to the first group is created of the first and second volumes. A first backup includes backing up from the first snapshot to a backup storage. The first backup does not include third and fourth volumes of the cluster. That is, the third and fourth volumes are excluded or omitted from the first backup.

After the first backup is complete, a second snapshot corresponding to the second group is created of the third and fourth volumes of the cluster. A second snapshot corresponding to the second group is created of the third and fourth volumes. A second backup, after the first backup, includes backing up from the second snapshot to the backup storage. The second backup does not include the first and second volumes of the cluster. That is, the first and second volumes are excluded or omitted from the second backup.

Thus, for a particular backup job of the entire cluster, the overall backup job is complete once the first and second backups have been completed. In other words, completion of just one of the first or second backups does not result in a complete backup of the cluster because there are other volumes of the cluster in another of the first or second backup that have yet to be backed up.

Generating the snapshots and backing up from each snapshot in a serial fashion helps to reduce disruption to the cluster as compared to generating the snapshots and backing up from each snapshot in parallel with another different snapshot. For example, the volumes of a cluster (and thus virtual machines residing on the volumes) that are not part of a current group being snapshotted can continue to process and service production requests uninterrupted. This helps to ensure high availability of the cluster during backup. In other embodiments, generating the snapshots and backing up from each snapshot may be performed in a parallel fashion.

As discussed above, in a specific embodiment, virtual machines in a cluster are grouped based on the volume (e.g., volume number or volume identifier) on which the virtual machines reside. Grouping based on volume can help to reduce the number of snapshots or disruption of a volume that may need to be generated for a particular backup of a cluster as compared to grouping based on other parameters or attributes.

Consider, as an example, that a cluster includes three cluster shared volumes including first cluster shared volume CSV1, second cluster shared volume CSV2, and third cluster shared volume CSV3; and two groups are to be created.

A virtual machine VM11 (100 GB) and a virtual machine VM12 (110 GB) resides on first cluster shared volume CSV1.

A virtual machine VM21 (40 GB) and a virtual machine VM22 (50 GB) reside on second cluster shared volume CSV2.

A virtual machine VM31 (40 GB) and a virtual machine VM32 (50 GB) reside on third cluster shared volume CSV3.

Grouping the virtual machines based on the cluster shared volume where they reside results in a first group (CSV1_Group) which includes {VM11, VM12}. Thus, a first snapshot will include only a snapshot of first cluster shared volume CSV1. That is, second and third cluster shared volumes CSV2 and CSV3, respectively are excluded from the first snapshot.

A second group (CSV2 and 3_Group) will include {VM21, VM22, VM31, VM32}. Thus, a second snapshot will include only a snapshot of the second cluster shared volume (CSV2) and the third cluster shared volume (CSV3). That is, first cluster shared volume CSV1 is excluded from the second snapshot.

If, however, virtual machines are instead grouped based on their individual sizes or other attributes, the resulting grouping may be a first group that includes {VM11, VM22, VM31}. This will require a snapshot of first, second, and third shared cluster volumes CSV1, CSV2, and CSV3, respectively, because snapshots are at the volume level.

A second group includes {VM12, VM21, VM32}. This will require snapshot of again first cluster shared volume CSV1, second cluster shared volume CSV2, and third cluster shared volume CSV3.

Thus, grouping based on CSV helps to reduce the number of snapshots or disruption to the cluster including the cluster shared volumes of the cluster. In a specific embodiment, a plurality of snapshots are obtained of a plurality of cluster shared volumes in a cluster. In this specific embodiment, a snapshot includes at least one cluster shared volume, and other snapshots of the plurality of snapshots do not include the at least one cluster shared volume, the other snapshots thereby including other clustered shared volumes of the plurality of cluster shared volumes.

In this specific embodiment, each snapshot of the plurality of snapshots is obtained consecutively, i.e., following one after the other. In other words, an overall backup job to backup a particular cluster may include two or more snapshots. Each snapshot of the two or more snapshots is obtained consecutively. A volume of the cluster may be included in at most one snapshot of the two or more snapshots. A time to complete the overall backup job may be at least the time required to obtain and backup a snapshot of the two or more snapshots plus the times required to obtain and backup each other snapshot of the two or more snapshots.

In other words, a first time period of an overall backup of a cluster may include obtaining and backing up a first snapshot which includes at most a first subset of volumes of the cluster. A second time period of the overall backup may include obtaining and backing up a second snapshot which includes at most a second subset of volumes of the cluster. The second time period is after the first time period. The second time period is after the first time period has elapsed. A volume of the first subset is not included in a volume of the second subset. A volume of the second subset is not included in the first subset.

Depending upon factors such as the sizes of the volumes, a number of volumes in the first subset may be the same as or different from a number of volumes in the second subset. In a specific embodiment, volumes are selected for inclusion in a particular subset, however, such that differences in total sizes of the subsets of volumes are minimized. For example, a difference in size between first and second subsets is X. If, hypothetically, a volume selected for the first subset was instead moved to the second subset, a difference in size between the first and second subsets is Y, where Y is greater than X.

It should be appreciated that virtual machines in a cluster may be grouped using other parameters or combination of parameters instead of or in addition to the cluster shared volume on which the virtual machines reside. For example, in other embodiments, rather than snapshots being created at the volume level, snapshots may be created at the individual virtual machine level.

As discussed above, in a specific embodiment, the system allows the backup administrator to decide whether to perform the backup of the cluster using a single snapshot option or multiple snapshot option (and specify the number of snapshot or CSV groupings to create). This provides the backup administrator with great flexibility in determining how to proceed with a backup of the cluster.

In another specific embodiment, the decision as to whether a single snapshot or multiple snapshot should be used is determined by the system. For example, in this specific embodiment, the system may automatically determine whether the single snapshot option or multiple snapshot option is most effective. The system may automatically determine the number of CSV groupings or CSVs to include in a group that is most effective.

Figure 10:
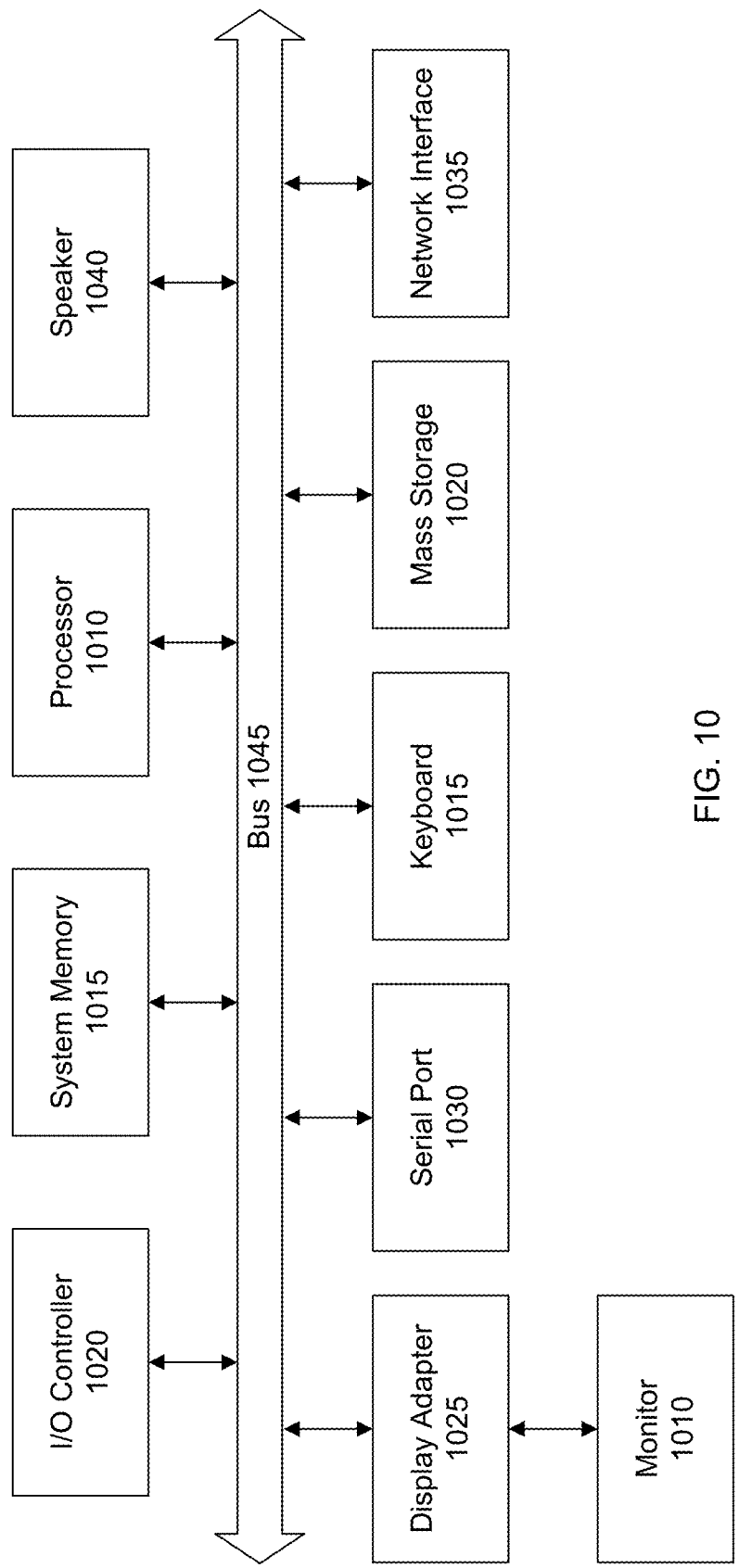
FIG. 10 shows a block diagram of a computer system that may be used to execute code and processes of the system, according to a specific embodiment.

FIG. 10 shows a system block diagram of a computer system used to execute the software of the present system described herein. The computer system 1005 includes a monitor 1010, keyboard 1015, and mass storage devices 1020. Computer system 1005 further includes subsystems such as central processor 1010, system memory 1015, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

In a specific embodiment, a method comprises receiving a request to perform a backup of a cluster, the cluster comprising a plurality of nodes running a plurality of virtual machines, and a plurality of cluster shared volumes (CSVs) on which the plurality of virtual machines reside; grouping the plurality virtual machines into a plurality of groups based on a CSV on which a virtual machine resides, a group thereby comprising one or CSVs, and a virtual machine of the group thereby residing on a CSV of the group, the grouping comprising load balancing based on a size of a CSV; assigning ownership of a first group of CSVs to a subset of the nodes, a node in the subset being responsible for backing up a particular CSV of the first group; assigning ownership of a second group of CSVs to the subset of the node, the node in the subset being responsible for backing up a particular CSV of the second group; obtaining a first snapshot of CSVs of the first group, the first snapshot excluding other CSVs of the cluster not in the first group; backing up virtual machines residing on CSVs of the first group from the first snapshot, wherein during the backing up, a CSV in the first group is backed up concurrently with a backup of another CSV in the first group; after the backing up virtual machines residing on CSVs of the first group from the first snapshot: obtaining a second snapshot of CSVs in the second group, the second snapshot excluding other CSVs of the cluster not in the second group; and backing up virtual machines residing on CSVs of the second group from the second snapshot, wherein during the backing up, a CSV in the second group is backed up concurrently with a backup of another CSV in the second group; and after the backing up from both the first and second snapshots, determining that the backup of the cluster is complete.

In a specific embodiment, there is a method for backing up a plurality of cluster shared volumes via multiple snapshots, the plurality of cluster shared volumes being accessible by a plurality of nodes, the method comprising: designating a subset of the plurality of nodes as being backup proxy nodes responsible for backing up the plurality of cluster shared volumes; dividing the plurality of cluster shared volumes into a plurality of groups, each group having a number of cluster shared volumes that is less than a total number of the plurality of cluster shared volumes; initiating generation of a particular snapshot for a number of particular cluster shared volumes belonging to a particular group; backing up by the backup proxy nodes data from the particular cluster shared volumes belonging to the particular group using the particular snapshot; and after the backing up, repeating the initiating snapshot generation and backing up until each group of cluster shared volumes has been backed up.

In an embodiment, the particular snapshot is a first snapshot, the particular group is a first group, and the method comprises: after backing up data from cluster shared volumes belonging to the first group using the first snapshot, initiating generation of a second snapshot for cluster shared volumes belonging to a second group; and backing up by the backup proxy nodes data from the cluster shared volumes belonging to the second group using the second snapshot.

A backup proxy node may be responsible for backing up a shared volume belonging to the particular group, and another backup proxy node may be responsible for backing up a different cluster shared volume belonging to the same particular group.

The method may include backing up by a first backup proxy node data from a first cluster shared volume belonging to a first group using a first snapshot; and during the backing up by a first backup proxy node, backing up by a second backup proxy node data from a second cluster shared volume belonging to the first group using the first snapshot, wherein the first backup proxy node is different from the second backup proxy node, and the first cluster shared volume is different from the second cluster shared volume.

In an embodiment, other cluster shared volumes belonging to other groups are excluded from the particular snapshot for the particular cluster shared volumes belonging to the particular group. The method may include receiving, from a user, a number of cluster shared volumes in each group.

The method may include identifying sizes of the plurality of cluster shared volumes; and based on the sizes, assigning the plurality of cluster shared volumes to the plurality of groups such that a difference between a sum of sizes of cluster shared volumes in a group, and a sum of sizes of other cluster shared volumes in another group is minimized.

In another specific embodiment, there is a system for backing up a cluster having a plurality of cluster shared volumes via multiple snapshots, the plurality of cluster shared volumes being accessible by a plurality of nodes in the cluster, the system comprising: a processor-based system executed on a computer system and configured to: designate a subset of the plurality of nodes as being backup proxy nodes responsible for backing up the plurality of cluster shared volumes; divide the plurality of cluster shared volumes into a plurality of groups, each group having a number of cluster shared volumes that is less than a total number of the plurality of cluster shared volumes; initiate generation of a particular snapshot for a number of particular cluster shared volumes belonging to a particular group; backup by the backup proxy nodes data from the particular cluster shared volumes belonging to the particular group using the particular snapshot; and after the backup, repeat the initiating snapshot generation and backing up until each group of cluster shared volumes has been backed up.

In another specific embodiment, there is a computer program product, comprising a non-transitory computer-readable medium having a computer-readable program code embodied therein, the computer-readable program code adapted to be executed by one or more processors to implement a method comprising: designating a subset of the plurality of nodes as being backup proxy nodes responsible for backing up the plurality of cluster shared volumes; dividing the plurality of cluster shared volumes into a plurality of groups, each group having a number of cluster shared volumes that is less than a total number of the plurality of cluster shared volumes; initiating generation of a particular snapshot for a number of particular cluster shared volumes belonging to a particular group; backing up by the backup proxy nodes data from the particular cluster shared volumes belonging to the particular group using the particular snapshot; and after the backing up, repeating the initiating snapshot generation and backing up until each group of cluster shared volumes has been backed up.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of performing an entire backup of a large-scale cluster via multiple snapshots, the method comprising:
    designating a subset of a plurality of nodes in the cluster as being backup proxy nodes, the large-scale cluster comprising a plurality of virtual machines hosted by the plurality of nodes, and a plurality of cluster shared volumes on which the plurality of virtual machines reside, the plurality of cluster shared volumes being accessible by the plurality of nodes, and the backup proxy nodes being responsible for backing up the plurality of cluster shared volumes, each of the cluster shared volumes being targeted for backup and comprising a set of storage devices logically grouped to expose a volume to the nodes of the cluster and having a virtual hard disk, the virtual hard disk being associated with a virtual machine and being accessible by the nodes of the cluster;
    grouping the plurality of virtual machines according to which particular cluster shared volume each particular virtual machine resides to form a plurality of groups of cluster shared volumes, each group of cluster shared volumes comprising a subset of the plurality of cluster shared volumes, and having a number of cluster shared volumes that is less than a total number of the plurality of cluster shared volumes;
    initiating generation of a particular snapshot for a particular group of cluster shared volumes on which a particular group of virtual machines reside, the particular snapshot thereby including all cluster shared volumes in the particular group, and not including other cluster shared volumes not in the particular group on which other virtual machines, not in the particular group of virtual machines, reside, the cluster shared volumes in the particular group, and the cluster shared volumes not in the particular group having been targeted for backup;
    backing up by the backup proxy nodes data from the particular cluster shared volumes belonging to the particular group using the particular snapshot while omitting other cluster shared volumes targeted for backup on which the other virtual machines reside; and
    after the backing up, repeating the initiating snapshot generation for each remaining different particular group of cluster shared volumes and backing up from each of the remaining different particular groups of cluster shared volumes using different respective snapshots until each group of cluster shared volumes has been backed up to complete the entire backup of the large-scale cluster, wherein the different respective snapshots are generated in a serial fashion.

2. The method of claim 1 wherein the particular snapshot is a first snapshot, the particular group is a first group, and the method comprises:
    after backing up data from cluster shared volumes belonging to the first group using the first snapshot, initiating generation of a second snapshot for cluster shared volumes belonging to a second group; and
    backing up by the backup proxy nodes data from the cluster shared volumes belonging to the second group using the second snapshot.

3. The method of claim 1 wherein a backup proxy node is responsible for backing up a cluster shared volume belonging to the particular group, and another backup proxy node is responsible for backing up a different cluster shared volume belonging to the same particular group.

4. The method of claim 1 comprising:
    backing up by a first backup proxy node data from a first cluster shared volume belonging to a first group using a first snapshot; and
    during the backing up by a first backup proxy node, backing up by a second backup proxy node data from a second cluster shared volume belonging to the first group using the first snapshot,
    wherein the first backup proxy node is different from the second backup proxy node, and the first cluster shared volume is different from the second cluster shared volume.

5. The method of claim 1 wherein other cluster shared volumes belonging to other groups are excluded from the particular snapshot for the particular cluster shared volumes belonging to the particular group.

6. The method of claim 1 comprising:
    receiving, from a user, a number of cluster shared volumes to include in each group.

7. The method of claim 1 comprising:
    identifying sizes of the plurality of cluster shared volumes; and
    based on the sizes, forming the plurality of groups of cluster shared volumes such that a difference between a sum of sizes of cluster shared volumes in a group, and a sum of sizes of other cluster shared volumes in another group is minimized.

8. A system of performing an entire backup of a large-scale cluster via multiple snapshots, the system comprising:

a processor-based system executed on a computer system and configured to:

designate a subset of a plurality of nodes in the cluster as being backup proxy nodes, the large-scale cluster comprising a plurality of virtual machines hosted by the plurality of nodes, and a plurality of cluster shared volumes on which the plurality of virtual machines reside, the plurality of cluster shared volumes being accessible by the plurality of nodes, and the backup proxy nodes being responsible for backing up the plurality of cluster shared volumes, each of the cluster shared volumes being targeted for backup and comprising a set of storage devices logically grouped to expose a volume to nodes of the cluster and having a virtual hard disk, the virtual hard disk being associated with a virtual machine and being accessible by the nodes of the cluster;

group the plurality of virtual machines according to which particular cluster shared volume each particular virtual machine resides to form a plurality of groups of cluster shared volumes, each group of cluster shared volumes comprising a subset of the plurality of cluster shared volumes, and having a number of cluster shared volumes that is less than a total number of the plurality of cluster shared volumes;

initiate generation of a particular snapshot for a particular group of cluster shared volumes on which a particular group of virtual machines reside, the particular snapshot thereby including all cluster shared volumes in the particular group, and not including other cluster shared volumes not in the particular group on which other virtual machines, not in the particular group of virtual machines, reside, the cluster shared volumes in the particular group, and the cluster shared volumes not in the particular group having been targeted for backup;

backup by the backup proxy nodes data from the particular cluster shared volumes belonging to the particular group using the particular snapshot and omitting other cluster shared volumes targeted for backup because the other cluster shared volumes do not belong to the particular group; and after the backup, repeat the initiating snapshot generation for each remaining different particular group of cluster shared volumes and the backup from each of the remaining different particular groups of cluster shared volumes using different respective snapshots until each group of cluster shared volumes has been backed up to complete the entire backup of the large-scale cluster, wherein the initiating snapshot generation for each remaining different particular group of cluster shared volumes is performed in a serial fashion.

9. The system of claim 8 wherein the processor-based system is configured to:

after backing up data from cluster shared volumes belonging to the first group using the first snapshot, initiate generation of a second snapshot for cluster shared volumes belonging to a second group; and backup by the backup proxy nodes data from the cluster shared volumes belonging to the second group using the second snapshot.

10. The system of claim 8 wherein a backup proxy node is responsible for backing up a cluster shared volume belonging to the particular group, and another backup proxy node is responsible for backing up a different cluster shared volume belonging to the same particular group.

11. The system of claim 8 wherein the processor-based system is configured to:

backup by a first backup proxy node data from a first cluster shared volume belonging to a first group using a first snapshot; and during the backing up by a first backup proxy node, backup by a second backup proxy node data from a second cluster shared volume belonging to the first group using the first snapshot, wherein the first backup proxy node is different from the second backup proxy node, and the first cluster shared volume is different from the second cluster shared volume.

12. The system of claim 8 wherein other cluster shared volumes belonging to other groups are excluded from the particular snapshot for the particular cluster shared volumes belonging to the particular group.

13. The system of claim 8 wherein the processor-based system is configured to:

receive, from a user, a number of cluster shared volumes to include in each group.

14. The system of claim 8 wherein the processor-based system is configured to:

identify sizes of the plurality of cluster shared volumes; and based on the sizes, form the plurality of groups of cluster shared volumes such that a difference between a sum of sizes of cluster shared volumes in a group, and a sum of sizes of other cluster shared volumes in another group is minimized.

15. A computer program product, comprising a non-transitory computer-readable medium having a computer-readable program code embodied therein, the computer-readable program code adapted to be executed by one or more processors to implement a method comprising:

designating a subset of a plurality of nodes in a large-scale cluster as being backup proxy nodes, the large-scale cluster comprising a plurality of virtual machines hosted by the plurality of nodes, and a plurality of cluster shared volumes on which the plurality of virtual machines reside, the plurality of cluster shared volumes being accessible by the plurality of nodes, and the backup proxy nodes being responsible for backing up the plurality of cluster shared volumes, each of the cluster shared volumes being targeted for backup and comprising a set of storage devices logically grouped to expose a volume to nodes of the cluster and having a virtual hard disk, the virtual hard disk being associated with a virtual machine and being accessible by the nodes of the cluster;

providing a user with an option for single snapshot backup and an option for multiple snapshot backup;

determining that the user has specified the option for multiple snapshot backup;

upon the determination, grouping the plurality of virtual machines according to which particular cluster shared volume each particular virtual machine resides to form a plurality of groups of cluster shared volumes, each group of cluster shared volumes comprising a subset of the plurality of cluster shared volumes, and having a number of cluster shared volumes that is less than a total number of the plurality of cluster shared volumes;

initiating generation of a particular snapshot for a particular group of cluster shared volumes on which a particular group of virtual machines reside, the particular snapshot thereby including all cluster shared volumes in the particular group, and not including other cluster shared volumes not in the particular group on which other virtual machines, not in the particular group of virtual machines, reside, wherein the cluster shared volumes in the particular group, and the cluster shared volumes not in the particular group are targeted for backup;

backing up by the backup proxy nodes data from the particular cluster shared volumes belonging to the particular group using the particular snapshot, wherein the backing up comprises not backing up other cluster shared volumes targeted for backup; and after the backing up, repeating the initiating snapshot generation for each remaining different particular group of cluster shared volumes and backing up from each of the remaining different particular groups of cluster shared volumes using different respective snapshots until each group of cluster shared volumes has been backed up to complete an entire backup of the large-scale cluster, wherein the backing up from each of the remaining different particular groups of cluster shared volumes using different respective snapshots is performed serially.

16. The computer program product of claim 15 wherein the particular snapshot is a first snapshot, the particular group is a first group, and the method comprises:

after backing up data from cluster shared volumes belonging to the first group using the first snapshot, initiating generation of a second snapshot for cluster shared volumes belonging to a second group; and backing up by the backup proxy nodes data from the cluster shared volumes belonging to the second group using the second snapshot.

17. The computer program product of claim 15 wherein the method comprises:

backing up by a first backup proxy node data from a first cluster shared volume belonging to a first group using a first snapshot; and during the backing up by a first backup proxy node, backing up by a second backup proxy node data from a second cluster shared volume belonging to the first group using the first snapshot, wherein the first backup proxy node is different from the second backup proxy node, and the first cluster shared volume is different from the second cluster shared volume.

18. The computer program product of claim 15 wherein other cluster shared volumes belonging to other groups are excluded from the particular snapshot for the particular cluster shared volumes belonging to the particular group.

19. The computer program product of claim 15 wherein the method comprises:

receiving, from the user, a number of cluster shared volumes to include in each group.

20. The computer program product of claim 15 wherein the method comprises:

identifying sizes of the plurality of cluster shared volumes; and based on the sizes, forming the plurality of groups of cluster shared volumes such that a difference between a sum of sizes of cluster shared volumes in a group, and a sum of sizes of other cluster shared volumes in another group is minimized.

* * * * *